US009791908B2

(12) United States Patent
Grehan et al.

(10) Patent No.: US 9,791,908 B2
(45) Date of Patent: Oct. 17, 2017

(54) SYSTEMS AND METHODS FOR PROTECTING VIRTUALIZED ASSETS

(71) Applicant: SCHNEIDER ELECTRIC IT CORPORATION, West Kingston, RI (US)

(72) Inventors: David Grehan, Claremorris (IE); Sarah Jane Hannon, Ennis (IE); Frederik Kamminga, Vleuten (NL); Paula Porter, Loughrea (IE); Amit Kumar Khator, Karnataka (IN)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 181 days.

(21) Appl. No.: 14/535,120

(22) Filed: Nov. 6, 2014

(65) Prior Publication Data

US 2015/0128052 A1    May 7, 2015

(30) Foreign Application Priority Data

Nov. 7, 2013   (IN) ........................... 5013/CHE/2013

(51) Int. Cl.
*G06F 1/00*    (2006.01)
*G06F 1/26*    (2006.01)
(Continued)

(52) U.S. Cl.
CPC .............. *G06F 1/30* (2013.01); *G06F 1/3203* (2013.01); *G06F 3/0482* (2013.01);
(Continued)

(58) Field of Classification Search
CPC ........ G06F 1/30; G06F 1/3203; G06F 3/0482; G06F 3/0486; G06F 9/45533;
(Continued)

(56) References Cited

U.S. PATENT DOCUMENTS

| 4,868,832 A | 9/1989 | Marrington et al. |
| 5,845,090 A | 12/1998 | Collins, III et al. |

(Continued)

FOREIGN PATENT DOCUMENTS

| CN | 101098075 A | 1/2008 |
| WO | 2013095505 A1 | 6/2013 |
| WO | 2015106039 A1 | 7/2015 |

OTHER PUBLICATIONS

Extended European Search Report from corresponding European Applicant No. EP14192169.2 dated Mar. 19, 2015.

(Continued)

*Primary Examiner* — Mark Connolly
(74) *Attorney, Agent, or Firm* — Lando & Anastasi, LLP

(57) ABSTRACT

According to various aspects and embodiments, a power management system configured to protect a plurality of information technology (IT) assets is provided. The system includes a migration component executable by the at least one processor and configured to identify the plurality of IT assets, the plurality of IT assets including at least one power supply unit and at least one host server, generate an association between at least one IT asset and at least one power supply unit, receive a power-related event from the at least one power supply unit, correlate the power-related event with at least one affected IT asset based on the generated association, determine a sequence of actions, wherein the sequence of actions is configured to migrate at least one virtual machine from the at least one affected IT asset to a non-affected asset, and execute the sequence of actions.

18 Claims, 12 Drawing Sheets

(51) Int. Cl.
  *G06F 11/00* (2006.01)
  *G06F 1/30* (2006.01)
  *H04L 12/24* (2006.01)
  *G06F 9/455* (2006.01)
  *G06F 3/0486* (2013.01)
  *G06F 3/0482* (2013.01)
  *G06F 9/48* (2006.01)
  *G06F 1/32* (2006.01)

(52) U.S. Cl.
  CPC ........ *G06F 3/0486* (2013.01); *G06F 9/45533* (2013.01); *G06F 9/45558* (2013.01); *G06F 9/4856* (2013.01); *H04L 41/22* (2013.01); *G06F 2009/4557* (2013.01)

(58) Field of Classification Search
  CPC ............... G06F 9/45558; G06F 9/4856; G06F 2009/4557; H04L 41/22
  See application file for complete search history.

(56) References Cited

U.S. PATENT DOCUMENTS

| | | | |
|---|---|---|---|
| 5,978,594 | A | 11/1999 | Bonnell et al. |
| 7,146,353 | B2 | 12/2006 | Garg et al. |
| 7,197,433 | B2 | 3/2007 | Patel et al. |
| 7,389,403 | B1 | 6/2008 | Alpert et al. |
| 7,432,617 | B2 | 10/2008 | Kanouda et al. |
| 7,451,336 | B2 | 11/2008 | Manuell et al. |
| 7,502,333 | B2* | 3/2009 | Modi ................ H04L 41/0803 370/255 |
| 8,121,940 | B2* | 2/2012 | Haggerty ............... G06Q 20/10 705/38 |
| 8,335,703 | B1 | 12/2012 | Pulier et al. |
| 8,674,823 | B1 | 3/2014 | Contario et al. |
| 2003/0200295 | A1 | 10/2003 | Roberts et al. |
| 2003/0236822 | A1 | 12/2003 | Graupner et al. |
| 2004/0010569 | A1 | 1/2004 | Thomas et al. |
| 2004/0230848 | A1 | 11/2004 | Mayo et al. |
| 2005/0055590 | A1 | 3/2005 | Farkas et al. |
| 2005/0086544 | A1* | 4/2005 | Egan ........................ G06F 1/30 713/300 |
| 2005/0114507 | A1 | 5/2005 | Tarui et al. |
| 2005/0228618 | A1 | 10/2005 | Patel et al. |
| 2005/0251802 | A1 | 11/2005 | Bozek et al. |
| 2006/0112286 | A1 | 5/2006 | Whalley et al. |
| 2007/0067435 | A1 | 3/2007 | Landis et al. |
| 2007/0088822 | A1 | 4/2007 | Coile et al. |
| 2007/0150584 | A1 | 6/2007 | Srinivasan |
| 2007/0234077 | A1 | 10/2007 | Rothman et al. |
| 2007/0271475 | A1 | 11/2007 | Hatasaki et al. |
| 2008/0104587 | A1 | 5/2008 | Magenheimer et al. |
| 2008/0177424 | A1 | 7/2008 | Wheeler |
| 2008/0229318 | A1 | 9/2008 | Franke |
| 2008/0294917 | A1 | 11/2008 | Khan et al. |
| 2009/0037030 | A1* | 2/2009 | Chidambaram ...... H02J 13/001 700/297 |
| 2009/0106409 | A1 | 4/2009 | Murata |
| 2009/0113060 | A1 | 4/2009 | Jacob et al. |
| 2009/0121547 | A1 | 5/2009 | Paik et al. |
| 2009/0187782 | A1 | 7/2009 | Greene et al. |
| 2009/0189774 | A1* | 7/2009 | Brundridge ........... H02J 13/001 340/654 |
| 2009/0204826 | A1 | 8/2009 | Cox et al. |
| 2009/0249354 | A1 | 10/2009 | Yamaguchi et al. |
| 2009/0276771 | A1 | 11/2009 | Nickolov et al. |
| 2010/0023940 | A1 | 1/2010 | Iwamatsu et al. |
| 2010/0026974 | A1 | 2/2010 | Wiener et al. |
| 2010/0111112 | A1 | 5/2010 | Bickel |
| 2010/0131957 | A1 | 5/2010 | Kami |
| 2010/0141046 | A1 | 6/2010 | Paik |
| 2010/0145884 | A1 | 6/2010 | Paik |
| 2010/0191854 | A1 | 7/2010 | Isci et al. |
| 2010/0211669 | A1 | 8/2010 | Dalgas et al. |
| 2010/0211810 | A1 | 8/2010 | Zacho |
| 2011/0018342 | A1 | 1/2011 | Park et al. |
| 2011/0035611 | A1 | 2/2011 | Brey et al. |
| 2011/0072430 | A1 | 3/2011 | Mani |
| 2011/0078474 | A1 | 3/2011 | Hatasaki et al. |
| 2011/0099403 | A1 | 4/2011 | Miyata et al. |
| 2011/0107332 | A1 | 5/2011 | Bash |
| 2011/0187197 | A1 | 8/2011 | Moth |
| 2011/0202728 | A1 | 8/2011 | Nichols et al. |
| 2011/0239010 | A1 | 9/2011 | Jain et al. |
| 2011/0282982 | A1 | 11/2011 | Jain |
| 2011/0320556 | A1* | 12/2011 | Reuther ................ G06F 9/4856 709/213 |
| 2012/0036383 | A1 | 2/2012 | Iwata |
| 2012/0098343 | A1 | 4/2012 | Harris et al. |
| 2012/0137289 | A1 | 5/2012 | Nolterieke et al. |
| 2012/0192007 | A1 | 7/2012 | Weilnau, Jr. et al. |
| 2013/0116946 | A1* | 5/2013 | Familiant ................. H02J 3/00 702/58 |
| 2013/0247048 | A1 | 9/2013 | Le Saux et al. |
| 2014/0019974 | A1* | 1/2014 | Siu ........................ G06F 9/4856 718/1 |
| 2014/0215073 | A1 | 7/2014 | Dow et al. |
| 2014/0310719 | A1 | 10/2014 | Egner et al. |
| 2014/0337832 | A1 | 11/2014 | Adogla |
| 2014/0337833 | A1 | 11/2014 | Adogla |
| 2014/0337834 | A1 | 11/2014 | Adogla |
| 2015/0128052 | A1 | 5/2015 | Grehan et al. |
| 2016/0234073 | A1* | 8/2016 | Maes ...................... H04L 41/12 |

OTHER PUBLICATIONS

K. Dunlap, "Cooling Audit for Identifying Potential Cooling Problems in Data Centers", White Paper #40, pp. 1-18, American Power Conversion, May 20, 2004, published on World Wide Web.
N. Rasmussen, "Calculating Total Cooling Requirements for Data Centers", White Paper #25, pp. 1-8, American Power Conversion, May 20, 2004, published on World Wide Web.
N. Rasmussen, "Cooling Strategies for Ultra-High Density Racks and Blade Servers", White Paper #46, pp. 1-22, American Power Conversion, Mar. 29, 2005, published on World Wide Web.
N. Rasmussen, "Strategies for Deploying Blade Servers in Existing Data Centers", White Paper #125, pp. 1-14, American Power Conversion, Mar. 29, 2005, published on World Wide Web.
Pinheiro, Eduardo, "Load Balancing and Unbalancing for Power and Performance in Cluster-Based Systems," Internet Citation, May 1, 2001 URL:http://research.ac.upc.es/pact01/colp/paper04.pdf, retrieved on Nov. 17, 2003.
S. Niles: "Virtualization: Optimized Power and Cooling to Maximize Benefits", Feb. 4, 2009 (Feb. 4, 2009), pp. 1-27, XP002664678.

* cited by examiner

SYSTEMS AND METHODS FOR PROTECTING VIRTUALIZED ASSETS

CROSS REFERENCE TO RELATED APPLICATION

This application claims the benefit under 35 U.S.C. §119 of Indian Patent Application No. 5013/CHE/2013 filed on Nov. 7, 2013 which is hereby incorporated herein by reference in its entirety for all purposes.

BACKGROUND

Technical Field

The technical field generally relates to power management within information technology (IT) environments, and more particularly, to systems and methods for managing and protecting virtualized assets.

Background Discussion

The widespread adoption of virtualization technologies has increased the necessity of protecting critical physical assets (e.g., servers) which are responsible for hosting virtualized assets such as virtual machines. For example, a server may host multiple virtual machines and may be attached to one or more uninterruptable power supplies (UPSs) to insure continuous operation. In the event of a power failure, a UPS may continue to power the server for some period of time. However, during a power failure it may be necessary to gracefully power-down the server in order to maintain the integrity of one or more virtual machines hosted on the server.

Traditional power management and monitoring of information technology (IT) assets includes specialized software running on one or more servers. The specialized software may be configured to communicate with one or more UPSs (e.g., via a network) and process UPS events. For example, in the event of a power outage the specialized software may receive a UPS event indicating backup power is being supplied via the UPS. Additional events from the UPS may provide indications of power values including current load, remaining power, and estimated amount of power remaining. In some circumstances the specialized software may determine a shutdown of IT assets is appropriate. In these circumstances, the specialized software may execute shutdown commands (e.g., remote procedures) on one or more servers associated with a UPS that has indicated a fault. The one or more servers may perform an orderly shutdown of hosted virtual machines prior to turning off.

SUMMARY

According to various aspects and embodiments, a power management system configured to protect a plurality of information technology (IT) assets is provided. The system a memory, at least one processor coupled to the memory. In addition, the system includes a migration component executable by the at least one processor and configured to identify the plurality of IT assets, the plurality of IT assets including at least one power supply unit and at least one host server, generate an association between at least one IT asset and at least one power supply unit, receive a power-related event from the at least one power supply unit, correlate the power-related event with at least one affected IT asset based on the generated to association, determine a sequence of actions, wherein the sequence of actions is configured to migrate at least one virtual machine from the at least one affected IT asset to a non-affected IT asset, and execute the sequence of actions.

In the system, the at least one power supply unit may be an uninterruptable power supply (UPS), and UPS may further include a primary outlet group and a second outlet group, and the at least one host server may be coupled to at least one of the primary outlet group and the second outlet group.

In the system, the plurality of IT assets may be identified via a discovery procedure. In one embodiment, the generated association may be generated between the at least one IT asset and the at least one power supply unit based on input received from visual elements of a user interface, the user interface visualizing a mapping of the at least one power supply unit and the at least one IT asset associated with the at least one power supply unit. In another embodiment, the generated association may be modified by a user dragging-and-dropping a representation of an unassociated IT asset of the plurality of IT assets onto the mapping.

In the system, the at least one affected IT asset may be identified as affected by the power-related event based on the generated association between the at least one power supply unit and one or more mapped IT assets associated with the at least one power supply unit. Also, the migration component may be further configured to communicate directly with the at least one affected IT asset to determine a plurality of virtual machines hosted by the at least one affected IT asset. In addition, the migration component may be further configured to communicate indirectly with the at least one affected IT asset to determine a plurality of virtual machines hosted by the at least one affected IT asset.

In the system, the sequence of actions may include actions identifying the plurality of virtual machines in an ordered list, and wherein the migration component is further configured to determine if at least one of the virtual machine is a critical IT asset. In one embodiment, the ordered list may be ordered based on an order in which IT assets appear in the mapping. In one embodiment, the executed sequence of actions may include an action to migrate at least one critical IT asset last.

According to another embodiment, a method of managing a plurality of information technology (IT) assets using a computer system including a memory, a display, and at least one processor coupled to the memory and the display is provided. The method includes the acts of identifying the plurality of IT assets, the plurality of IT assets including at least one power supply unit and at least one host server, generating an association between at least one IT asset and at least one power supply unit, receiving information related to a power-related event from the at least one power supply unit, correlating the power-related event with at least one affected IT asset based on the generated association, determining a sequence of actions, wherein the sequence of actions is configured to migrate at least one virtual machine from at least one affected IT asset, and executing the sequence of actions.

According to one embodiment, the act of generating the association between at least one IT asset and at least one power supply unit may include generating a user interface, the user interface visually representing a mapping of at least one power supply unit and the at least one IT asset associated with the at least one power supply unit.

According to another embodiment, the act of generating a sequence of actions may include identifying an ordered list including a plurality of IT assets and a plurality of virtual machines associated with each IT asset of the plurality of IT assets, and wherein the method may further comprise identifying at least one IT asset of the plurality of IT assets as being a critical IT asset.

In still another embodiment, the act of executing the sequence of actions may include communicating directly with each IT asset based on the ordered list. The method may further include transmitting a shutdown command for each virtual machine of the plurality of virtual machines based on the ordered list, wherein transmitting the shutdown command may further include shutting down the critical IT asset last. In addition, the method may include determining one or more IT assets for migration of the plurality of virtual machines. In one embodiment, the act of determining one or more IT assets for migration of the plurality of virtual machines includes determining whether the one or more IT assets are coupled to a power supply unit not experiencing a power failure based on the generated association.

According to another embodiment, a non-transitory computer readable medium storing instructions for managing a plurality of IT assets is provided. The instructions being executable by at least one processor of a computer system and configured to instruct the computer system to identify the plurality of IT assets, the plurality of IT assets including at least one power supply unit and at least one host server, generate an association between at least one IT asset and at least one power supply unit, receive a power-related event from the at least one power supply unit, correlate the power-related event with at least one affected IT asset based on the generated association, determine a sequence of actions, wherein the sequence of actions is configured to migrate at least one virtual machine from the at least one IT asset to a non-affected IT asset, and execute the sequence of actions.

In one embodiment, the generated association may be an association between the at least one IT asset and the at least one power supply unit based on input received from visual elements of a user interface, the user interface generating a mapping of the at least one power supply unit and the at least one IT asset associated to the at least one power supply unit.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed subject matter. Particular references to examples and embodiments, such as "an embodiment," "an example," "one example," "another embodiment," "another example," "some embodiments," "some examples," "other embodiments," "an alternate embodiment," "various embodiments," "one embodiment," "at least one embodiments," "this and other embodiments" or the like, are not necessarily mutually exclusive and are intended to indicate that a particular feature, structure, or characteristic described in connection with the embodiment or example and may be included in that embodiment or example and other embodiments or examples. The appearances of such terms herein are not necessarily all referring to the same embodiment or example.

Furthermore, in the event of inconsistent usages of terms between this document and documents incorporated herein by reference, the term usage in the incorporated references is supplementary to that of this document; for irreconcilable inconsistencies, the term usage in this document controls. In addition, the accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

As discussed above, virtualization technologies have become widespread in IT environments. In a traditional IT environments (e.g., data centers, server rooms, IT closets, etc) each server typically hosts a single operating system (OS) which in turn may host one or more shared resources such as web servers, databases, and storage repositories. In contrast, virtualized environments include servers which are configured to host one or more virtual machines. These servers are commonly referred to as hosts or Hypervisors. Virtual machines may also be referred to as guest operating systems. A Hypervisor presents the guest operating systems with a virtual operating platform and manages the execution of the guest operating systems. Multiple instances of a variety of operating systems may share the virtualized hardware resources. A virtual machine, as referred to herein, is a software implementation of a computer that executes programs like a physical machine.

Figure 1:
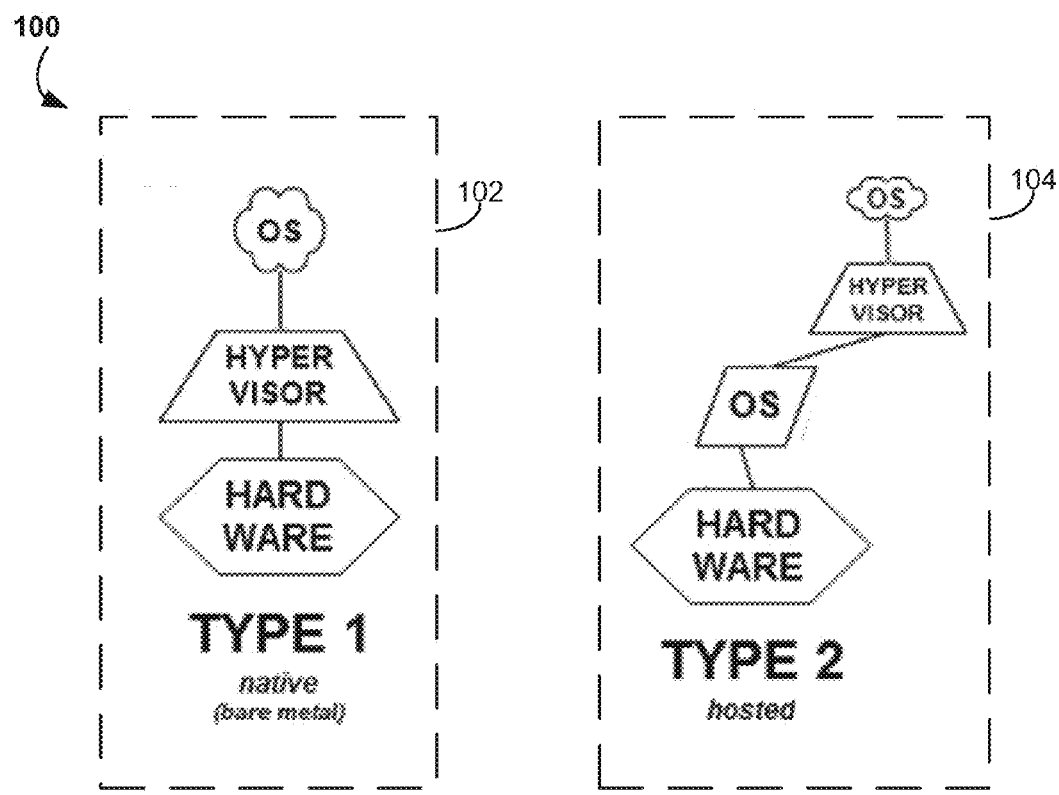
FIG. 1 is a block diagram of various types of Hypervisor configurations.

Hypervisors may be configured in one or more ways. For example, FIG. 1 illustrates various types of Hypervisors generally indicated at 100. The types 100 include a bare-metal type 102 and a hosted type 104. In regards to the bare-metal type 102, the Hypervisor is executed directly on the host server's hardware. Guest operating systems on the bare-metal type 102 operate at what is considered two levels from the server hardware (e.g., the operating system and Hypervisor are interfaced). In regards to the hosted-type 104, the Hypervisor is hosted and executed by an OS (e.g., Linux, Windows Server, etc). In this configuration, the virtual machine is executed by a Hypervisor application which is typically compatible with the operating system of the host. For example, VMware vSphere® offered by VMWare of Palo Alto, Calif. is one example of a hosted type 104 virtualization solution. Guest operating systems on the hosted type 104 operate at what is considered three levels from the server hardware.

As IT environments become increasingly virtualized it can become complex to ensure that each Hypervisor is adequately protected. Some IT environments may include a mix of virtualized technologies including servers configured as both the bare-metal type 102 and the hosted type 104. Traditional power management includes specialized software which is executed by an OS. For this reason, the specialized software may be incompatible with the bare-metal type 102 as the specialized software requires compatible operating systems. The hosted type 104 may be compatible with the specialized software; however, it may be impractical to install specialized software on each and every server.

Some aspects and embodiments disclosed herein are directed to a system and method for protecting virtualized assets within an IT environment without specialized power-protection software installed on each physical server. In some embodiments, migration and shutdown of virtual machines may be based on power-related events from power supply units (e.g., UPSs, PDUs, outlets, generators, electrical relays, etc.). For example, relationships between clustered Hypervisors, virtual machines, and power supply units may be determined and advantageously used to migrate virtual machines in the event of power faults. Virtualization technologies enable virtual machines to be moved amongst Hypervisors. Systems and methods in accord with some examples may migrate a virtual machine from a Hypervisor experiencing a power fault to a Hypervisor which is coupled to a non-faulting power supply unit. Although aspects and embodiments disclosed herein include examples directed to UPS devices, other power supply units may be utilized.

In other embodiments disclosed herein, a system and method to order shut down and startup of Hypervisors and virtual machines is provided. In the event a shutdown must occur, an ordered shutdown may be desirable. Lower priority assets may be shut off first while higher priority assets may be shut off last. For example, critical assets like storage arrays and virtual asset power management systems (VAPMS) may be depended on by other assets to operate and should be shut down last. Likewise, during startup a particular order may be desirable. For example, a database server may need to be operational prior to any an application server coming online.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Virtual Asset Power Management System

Figure 2:
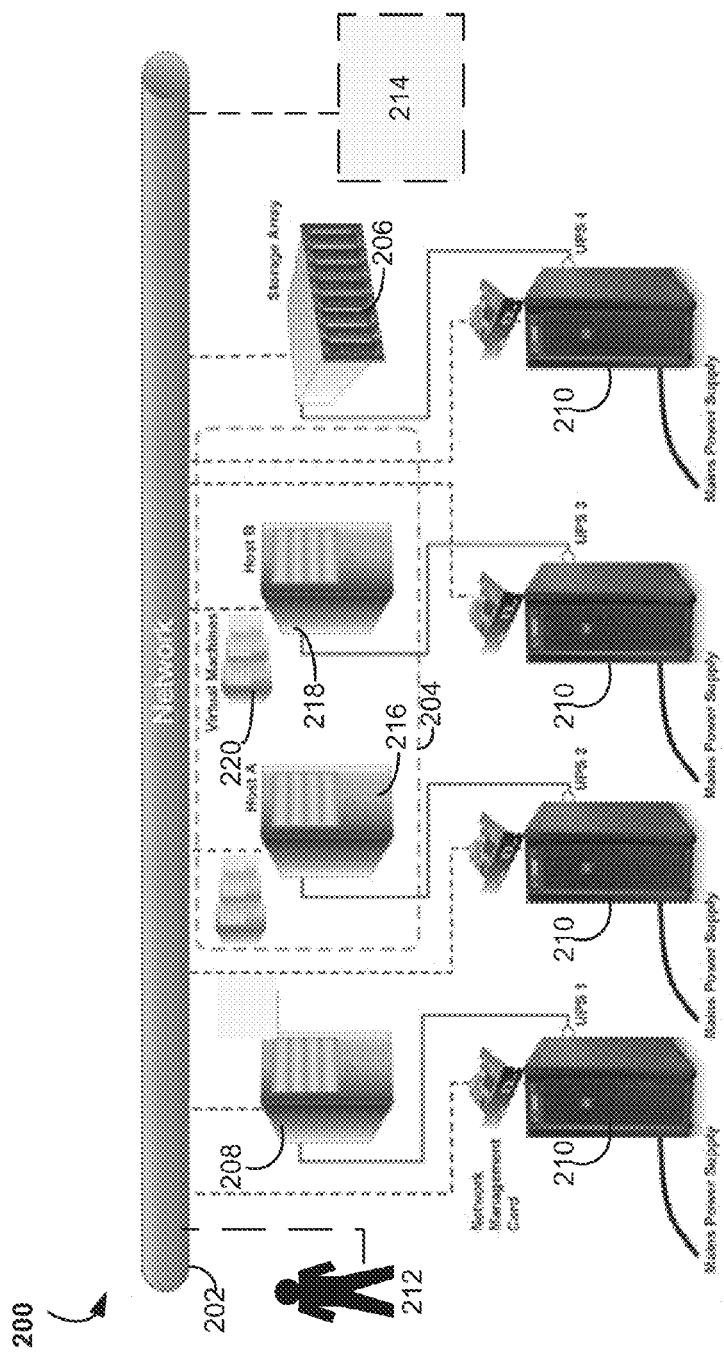
FIG. 2 is one example of an IT environment with virtualized assets.

As discussed above, the complexity of virtualized environments makes it difficult to determine whether an asset is protected. Various examples disclosed herein relate to protecting IT assets based on monitoring power-related events from associated UPSs. Within an IT environment, Hypervisors may be grouped together in a cluster in order to provide greater performance and availability than would be available with just one physical server. FIG. 2 is one example of an IT environment 200 including multiple Hypervisors and UPSs. The IT environment 200 includes a network 202, a cluster 204, a storage array 206, a virtual asset power management system 208, a plurality of UPSs 210, a user 212, and a third-party virtualization management system 214.

The cluster 204 includes a first Hypervisor 216 and a second Hypervisor 218. Although the cluster 204 is shown as including only two Hypervisors, it should be understood that additional Hypervisors may be included in a cluster. Likewise, although in the embodiment shown there is only one cluster, in other embodiments there may be multiple clusters. The first Hypervisor 216 and the second Hypervisor 218 may host a plurality of virtual machines, such as the virtual machines 220. The virtual machines 220 may host any number of shared resources such as databases, web servers and application servers, etc.

Migration of a virtual machine may include transferring an instance of a virtual machine hosted on one Hypervisor (e.g., the Hypervisor 216) and instructing a second Hypervisor (e.g., the Hypervisor 218) to host and execute the same virtual machine. This may be accomplished by centrally storing virtual machine images. For example, in the embodiment shown, virtual machines such as the virtual machines 220 may be executed from a virtual machine image physically located on the storage array 206. The Hypervisors 216 and 218 may launch one or more virtual machines 220 by retrieving and executing the virtual machine image located on the storage array 206. In one embodiment, migration of virtual machines includes the VAPMS 208 instructing a Hypervisor to launch one or more virtual machines via an application programming interface (API). The instruction may include a location (e.g., network path, physical path) of where the virtual machine image may be found and other execution parameters. For example, the instruction may include an IP address of the storage array 206 and a path to the virtual machine image. In another embodiment, the VAPMS 208 may instruct the third-party virtualization management system 214 to perform the migration by proxy.

According to various examples, the VAPMS 208 is implemented using one or more computer systems, such as the distributed computer system 900 discussed below with regard to FIG. 9. In the embodiment shown, the VAPMS 208 may be configured to monitor and manage one or more assets of the IT environment 200. For example, the VAPMS 208 may be configured to communicate with the Hypervisors 216 and 218 of the cluster 204 via the network 202. In addition, the VAPMS 208 may communicate with UPSs such as the UPSs 210 via the network 202. Thus, examples of the VAPMS 208 include a variety of hardware and software components configured to perform the functions described herein and examples are not limited to a particular hardware component, software component, or particular combination thereof.

Still referring to FIG. 2, the network 202 may include any communication network through which computer systems send and receive information. For example, the network 202 may be a public network, such as the internet, and may include other public or private network such as LANs, WANs, extranets and internets. As shown, the user 212 may utilize the network 202 to exchange data with the VAPMS 208. For example, the user 212 may access the VAPMS 208 using the network 202 from a remote computer system or from a mobile device such as a laptop or smart phone. In one embodiment, an application (or "app") may be executed on the computer system (or directly on the VAPMS 208) and may enable the user 212 to perform operations which configure, monitor and control the VAPMS 208. In other embodiments, the user 212 may access a webpage hosted by the VAPMS 208 in order to perform operations which configure, monitor and control the VAPMS 208.

To facilitate remote access, one or more IT assets may be configured with network interfaces and host one or more web services. For example, the VAPMS 208 may communicate with a web service which is responsible for handling requests, such as requests made by the user 212 via the network 202. In other examples, the one or more IT assets may communicate machine-to-machine via web services. As used herein, a web service may be defined as a software system designed to support interoperable machine-to-machine interaction over a network. An IT asset may be configured with one or more web services which include interfaces capable of generating and processing messages in a machine-processable format (e.g., Web Services Description Language (WSDL)). For example, the one or more IT assets may interact with each other using web services configured to process Simple Object Access Protocol (SOAP) messages. These messages may be communicated using HTTP with an XML serialization or other Web-related standard. In other examples, a web service may be configured according to Web-related communication standards.

In addition, information may flow between the elements, components and subsystems described herein using a variety of techniques. Such techniques include, for example, passing the information over the network 202 using standard protocols, such as TCP/IP, passing the information between modules in memory and passing the information by writing to a file, database, or some other non-volatile storage device. In addition, pointers, identifiers, or other references to information may be transmitted and received in place of, or in addition to, copies of the information. Conversely, the information may be exchanged in place of, or in addition to, pointers, identifiers, or other references to the information. Other techniques and protocols for communicating information may be used without departing from the scope of the examples disclosed herein.

As discussed above, the VAPMS may communicate with one or more IT assets via the network 202. This communication may include initially identifying assets and asset types. For example, the VAPMS may be configured to initiate a discovery request and receive responses from one or more IT assets in accordance with the process discussed below with reference to FIG. 10. In one embodiment, the discovery process may first discover UPSs such as the UPSs 210 of FIG. 2. Next, the discovery process may then discover other IT assets such as Hypervisors and third-party virtualization management systems. Based on the responses to the discovery requests, identifiers of IT assets may be stored in a non-volatile storage area of the VAPMS 208. These identifiers may include asset name, asset type, hostname, and IP address. In at least one embodiment, the VAPMS 208 may communicate with the third-party virtualization management system 214 to identify virtual IT assets. In this embodiment, the third party virtualization management system 214 may provide a list of Hypervisors and virtual machines via an API call. In still other embodiments, identifiers for UPSs, Hypervisors, and other IT assets may be manually defined by a user, such as the user 212.

Figure 3:
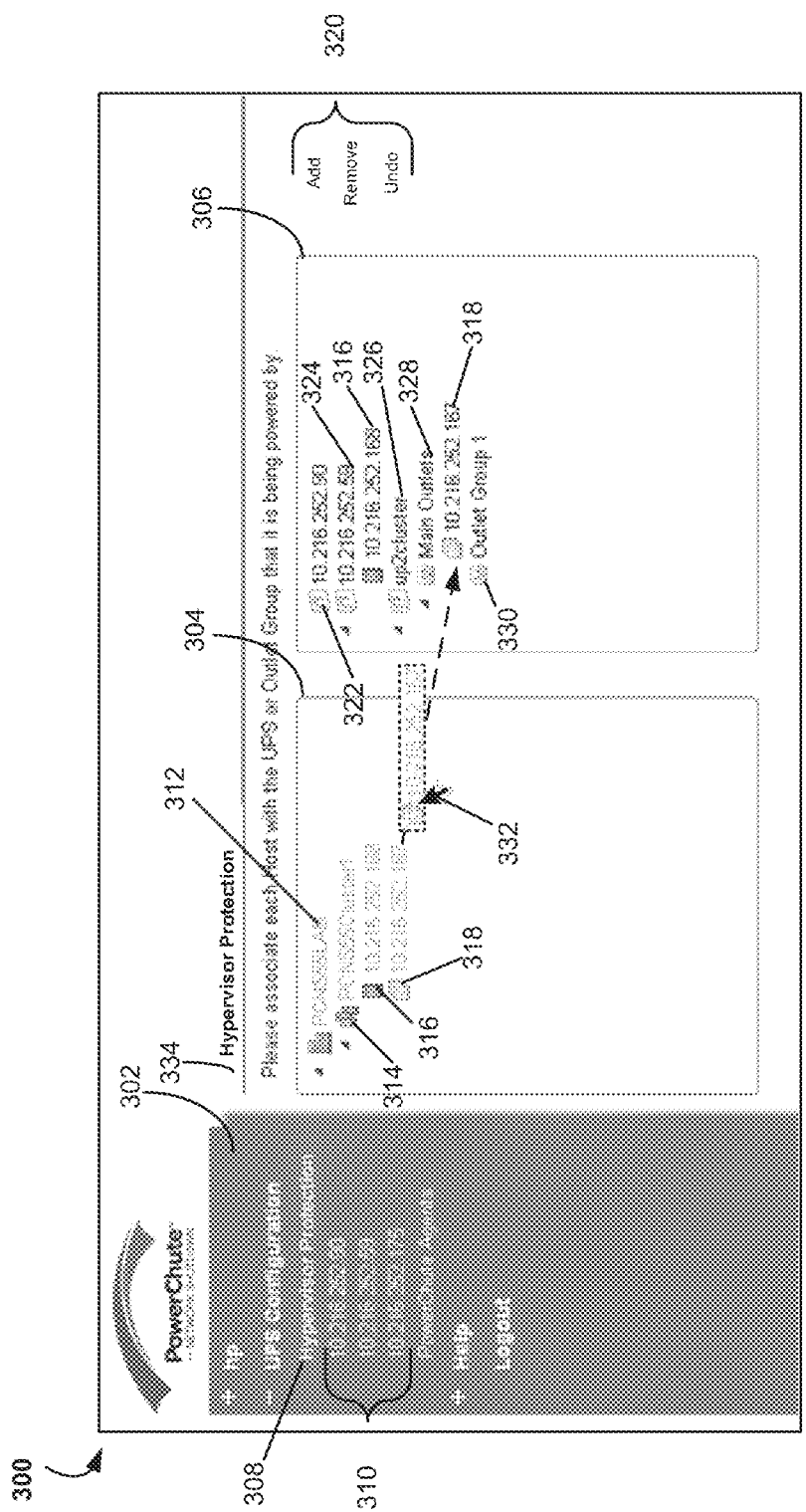
FIG. 3 is an illustration of a user interface of a virtual asset power management system.

The stored identifiers of IT assets may be subsequently displayed to a user to perform configuration and maintenance of the VAPMS 208. Referring now to FIG. 3, an example user interface screen 300 of the VAPMS 208 is illustrated. The user interface screen 300 includes a navigation panel 302 and a content panel 334.

The navigation panel 302 includes one or more navigation options including a Hypervisor Protection option 308 and Power Supply Device options 310. The VAPMS 208 may be configured to change the content of the content panel 334 by receiving a user selection from the navigation panel 302. For example, in the embodiment shown, the Hypervisor Protection options 308 was selected by the user 212 initiating a mouse operation (e.g., a single-click or double-click) or a keystroke. In the embodiment shown, power-related assets (e.g., UPSs, PDUs, etc) that were identified and stored are visually represented at 310.

In one embodiment, the VAPMS 208 may receive one or more user selections to configure location (e.g., identifier of an IT environment), cluster, and Hypervisor to UPS relationships. In the embodiment shown, selection of the Hypervisor Protection options 308 visualizes an inventory tree view 304 and a mapping tree view 306. The VAPMS 208 visualizes clusters and associated devices in a tree hierarchy to allow a user, such as the user 212, to visually determine how an IT environment is presently configured and protected. The inventory tree view 304 may be configured to display Hypervisor identifiers (e.g., leaves) under location and/or cluster nodes. For example, in the embodiment shown, a location node 312 includes a cluster node 314 and IT asset nodes 316 and 318. The cluster node 314 may represent the cluster 204 of FIG. 2. Likewise, the IT asset nodes 316 and 318 may represent the Hypervisors 216 and 218 of FIG. 2.

In one embodiment, the VAPMS 208 may be hosted in a virtual machine, such as one of the virtual machines 220 of FIG. 2. In this embodiment, a special icon such as the icon associated with the node 318 may indicate that the node (Hypervisor) includes an instance of the VAPMS 208, and thus, is a critical IT asset. As discussed further below with reference to the processes of FIGS. 10-11, migration and shutdown of virtual machines may treat critical IT assets differently. For example, IT assets hosting an instance of the VAPMS 208 or the third-party virtualization management system 214 should only be migrated and/or shutdown last to avoid service interruptions. Likewise, some critical IT assets, such as the storage array 206, may need to be shutdown last and started up first. As discussed above with reference to FIG. 1, Hypervisors may host and execute virtual machines based on virtual machines physically located on a storage array. For this reason, the VAPMS 208 may prioritize the startup and shutdown of these critical assets to avoid interruption of services.

The mapping tree view 306 is designed to allow a user, such as the user 212, to initiate the generation of associations between IT assets (e.g., Hypervisors 316 and 318) and one or more power supply units (e.g., UPSs 322, 324, and 326). The VAPMS 208 generates these associations, in part, via the user interface 300. These associations allow a user to determine if IT assets are protected and to make modifications as necessary. In addition, these associations allow the VAPMS 208 to receive and correlate power-related events from UPSs in order to make intelligent decisions based on which IT assets may be affected.

In one embodiment, the first time a user accesses the VAPMS 208, the mapping tree view 306 may be empty. In other embodiments, the mapping tree view 306 may include an existing list of UPSs and associations. As discussed further below with reference to FIG. 10, UPSs and associations between UPSs and IT assets may be automatically determined. In the embodiment shown, a user, such as the user 212, may add, remove, and undo changes to UPS nodes in the mapping tree view 306 using the mapping operations 320. For example, a user may click the Add option of the mapping options 320 and be presented with a list (not shown) of available UPS assets to be added to the mapping tree view 306.

In the embodiment shown, the mapping tree view 306 includes UPS nodes 322, 324 and 326. The UPS node 326 may represent a UPS device which is configured with a switched outlet group. For example, in the embodiment shown a main outlet group node 328 and a secondary outlet group node 330 is displayed. Each outlet group of the UPS node 326 represents a separately controllable outlet group of a physical UPS. As discussed further below with reference to the processes of FIGS. 10-12, the order in which migration and shutdown of Hypervisors occurs may be determined based on the order in which the outlet groups appear under a UPS node, such as the UPS node 328.

As discussed above, the VAPMS 208 may generate one or more associations based on the mapping tree view 306. In one embodiment, the user 212 may interact with the user interface 200 to generate the association of one or more Hypervisor nodes with one or more UPS nodes in the mapping tree view 306. For example, in the embodiment shown, the user 212 may use a mouse cursor 332 to initiate a drag-and-drop operation over the mapping tree view 306. In this example, releasing the cursor 332 will then associate the Hypervisor node 318 with the main outlet group node 328. A user may continue to map each Hypervisor within the cluster 314 until each IT asset is protected by an associated UPS. In the embodiment shown, the cluster 314 is grayed out (disabled) because each associated cluster asset has been associated with one or more UPSs in the mapping tree view 306.

Figure 10:
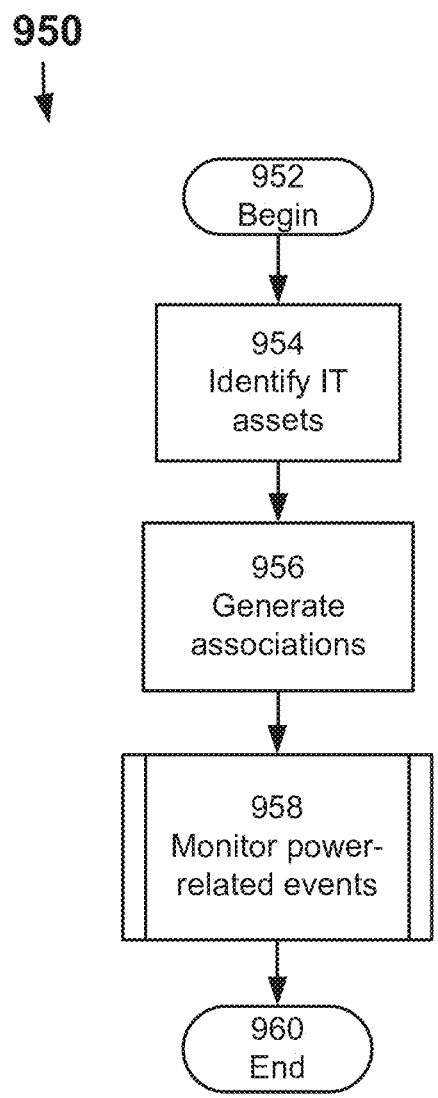
FIG. 10 is a flow diagram of one example of a virtual asset power management process according to various aspects and embodiments disclosed herein.
Figure 11:
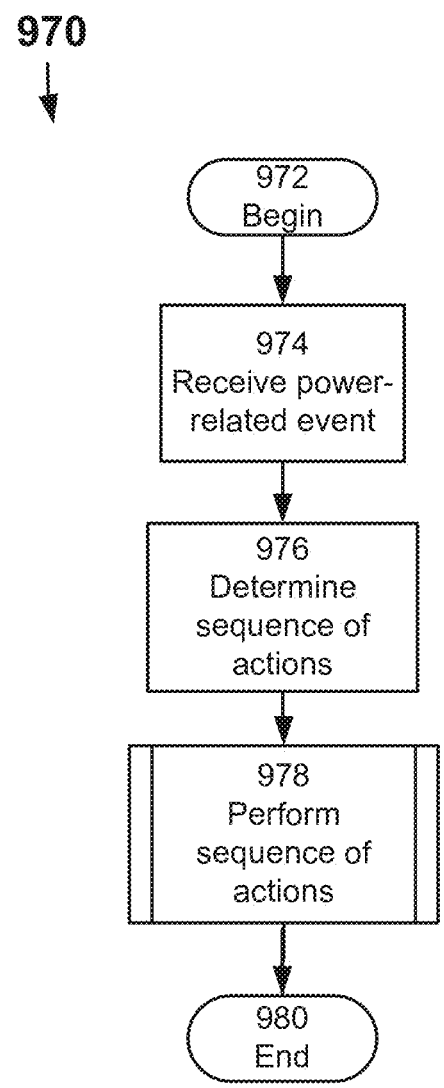
FIG. 11 is a flow diagram of one example method for monitoring power-related events according to various aspects and embodiments disclosed herein.
Figure 12:
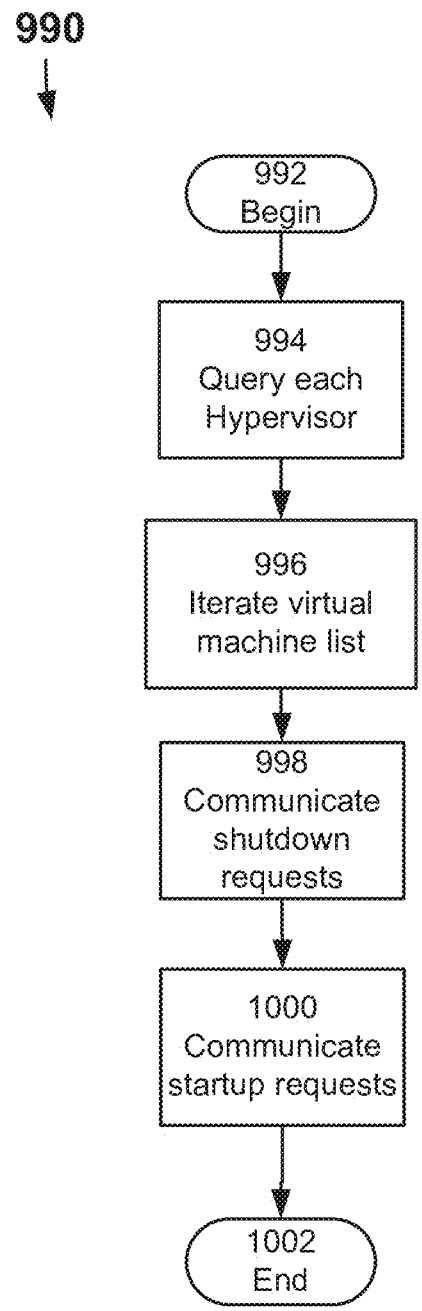
FIG. 12 is a flow diagram of one example method for executing sequences based on power-related events according to various aspects and embodiments disclosed herein.

In one embodiment, one or more Hypervisor nodes may be associated with an outlet group (e.g., outlet groups 328 or 330) or with a UPS node (e.g., UPS nodes 322 and 324). It should be understood that in some IT environments a Hypervisor may be backed up by more than one UPS. Accordingly, the mapping tree view 306 may include a Hypervisor node being associated with more than one UPS node or outlet group node. As discussed further below, when a Hypervisor has at least one associated UPS that is not experiencing an interruption in power, the VAPMS 208 may determine migration and shutdown processes in accordance with FIGS. 10-12 is unnecessary. As discussed below with reference to the processes of FIGS. 10-12, the order in which Hypervisors appear under UPS nodes, such as UPS nodes 322, 324 and 326, may determine the order in which migration and shutdown occurs.

After one or more UPS nodes are associated with Hypervisor nodes in the mapping tree view 306, the VAPMS may receive the generated associations based on a user action (e.g., clicking an apply button) and store the associations in a non-volatile memory area.

Figure 4:
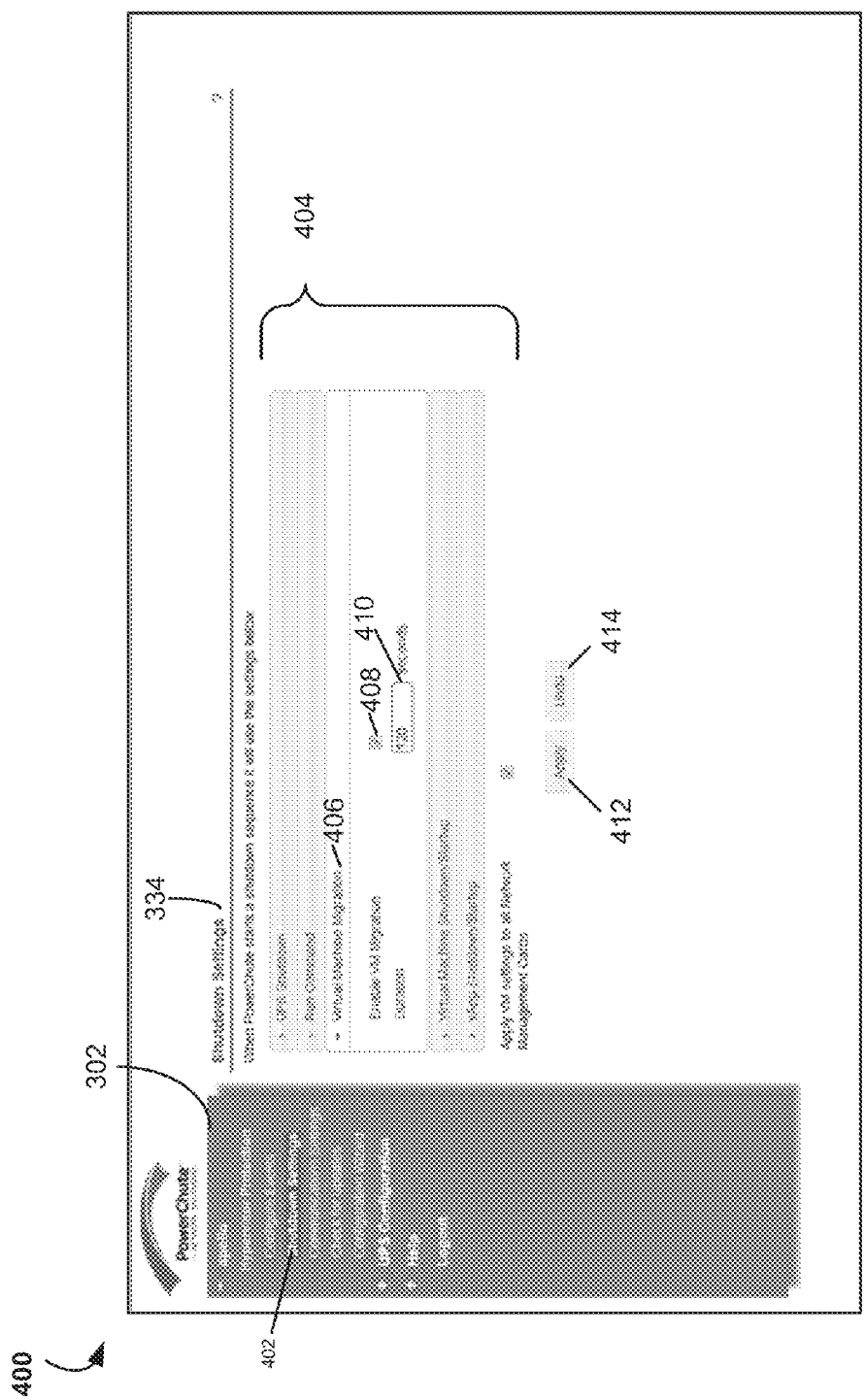
FIG. 4 is another illustration of a user interface of the virtual asset power management system.

Now referring to FIG. 4 with additional reference to FIG. 3, another example of a user interface of the VAPMS 208 is generally indicated at 400. In this example, settings related to the Shutdown Settings options 402 is visualized in the content panel 334. One or more global options related to shutdown and migration may be configured using the user interface 400. The VAPMS 208 may use one or more of the global options as a default parameter. As discussed below with reference to FIG. 11, settings may be defined with a high degree of granularity within the VAPMS 208 to provide fine grain control of migration and shutdown processes.

In the embodiment shown, the Shutdown Settings options 402 displayed within the content panel 334 includes an expander control 404 with various settings categories. The Virtual Machine Migration category 406 includes an Enable VM Migration check box 408 and a Duration entry box 410. The selection of the check box 408 enables a default mode of attempting to migrate virtual machines in the event of a detected power condition (e.g., a fault). The Duration entry box 410 determines the amount of time (in seconds) before the VAPMS 208 should exit out of the process of migrating virtual machines. An apply button 412 causes the VAPMS 208 to apply any changes made to the settings while an undo button 414 will undo any changes made.

Figure 5:
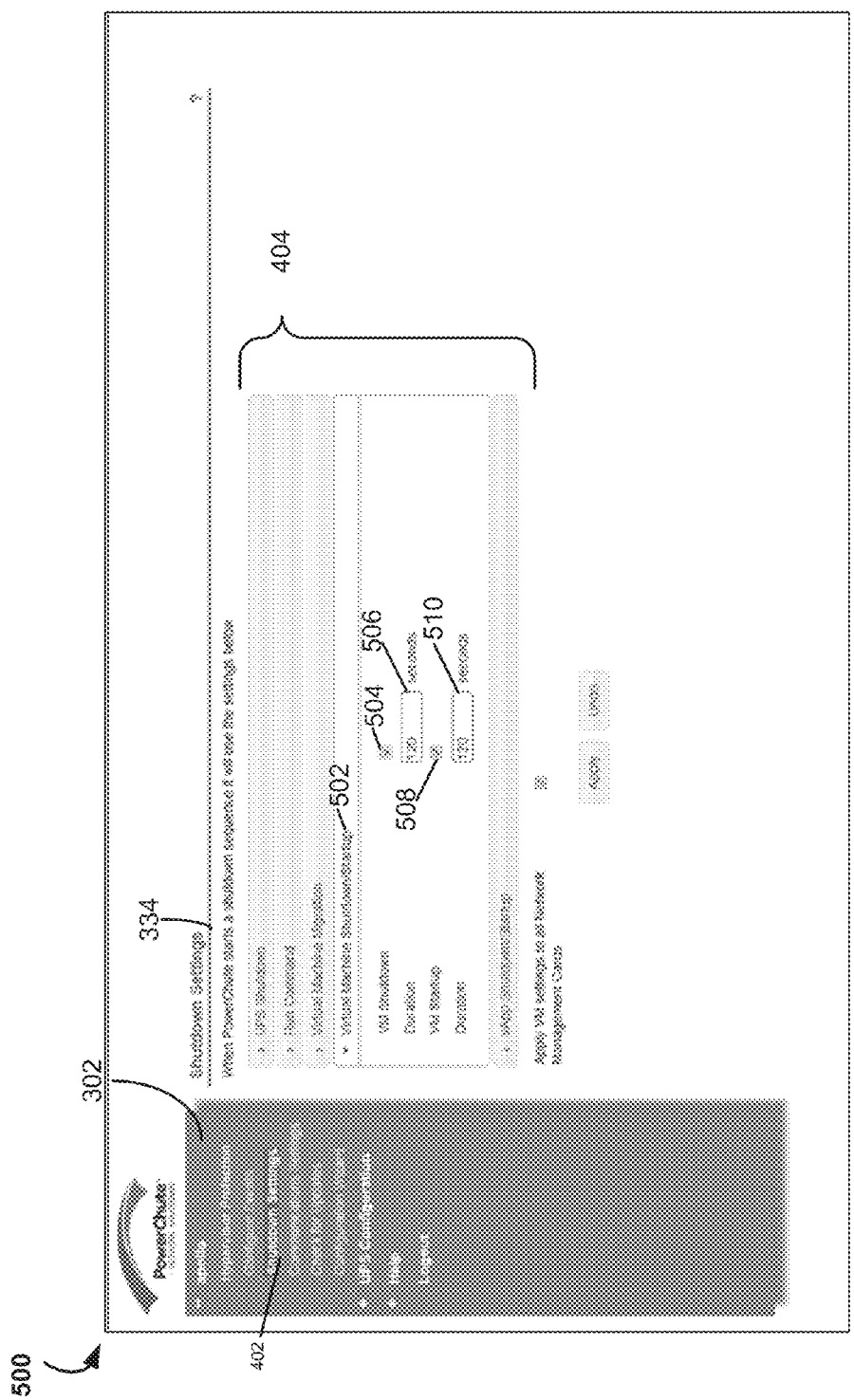
FIG. 5 is another illustration of a user interface of virtual asset power management system.

Now referring to FIG. 5 with additional reference to FIGS. 3-4, another example of a user interface of the VAPMS 208 is generally indicated at 500. In this example, settings related to the Shutdown Settings option 402 may be visualized in the content panel 334. As discussed above with reference to FIG. 4, the Shutdown Settings option 402 within the content panel 334 includes an expander control 404 with various settings categories. In the embodiment shown, the Virtual Machine Shutdown/Startup category 502 has been expanded (e.g., made visible) and includes an VM Shutdown checkbox 504, a VM Shutdown Duration entry box 506, a VM Startup checkbox 508, and a VM startup duration entry box 510. The VM shutdown checkbox 504 enables the option of shutting down virtual machines in the event of a power event detected by the VAPMS 208. As discussed below with reference to the process of FIGS. 10-12, when the option of shutting down virtual machines is enabled the VAPMS 208 will attempt to migrate (if enabled)

the virtual machines to another hypervisor first. The VM Shutdown Duration checkbox 506 determines the amount of time (in seconds) the Hypervisor VAPMS should wait before continuing with the next action in a shut down process.

Figure 6:
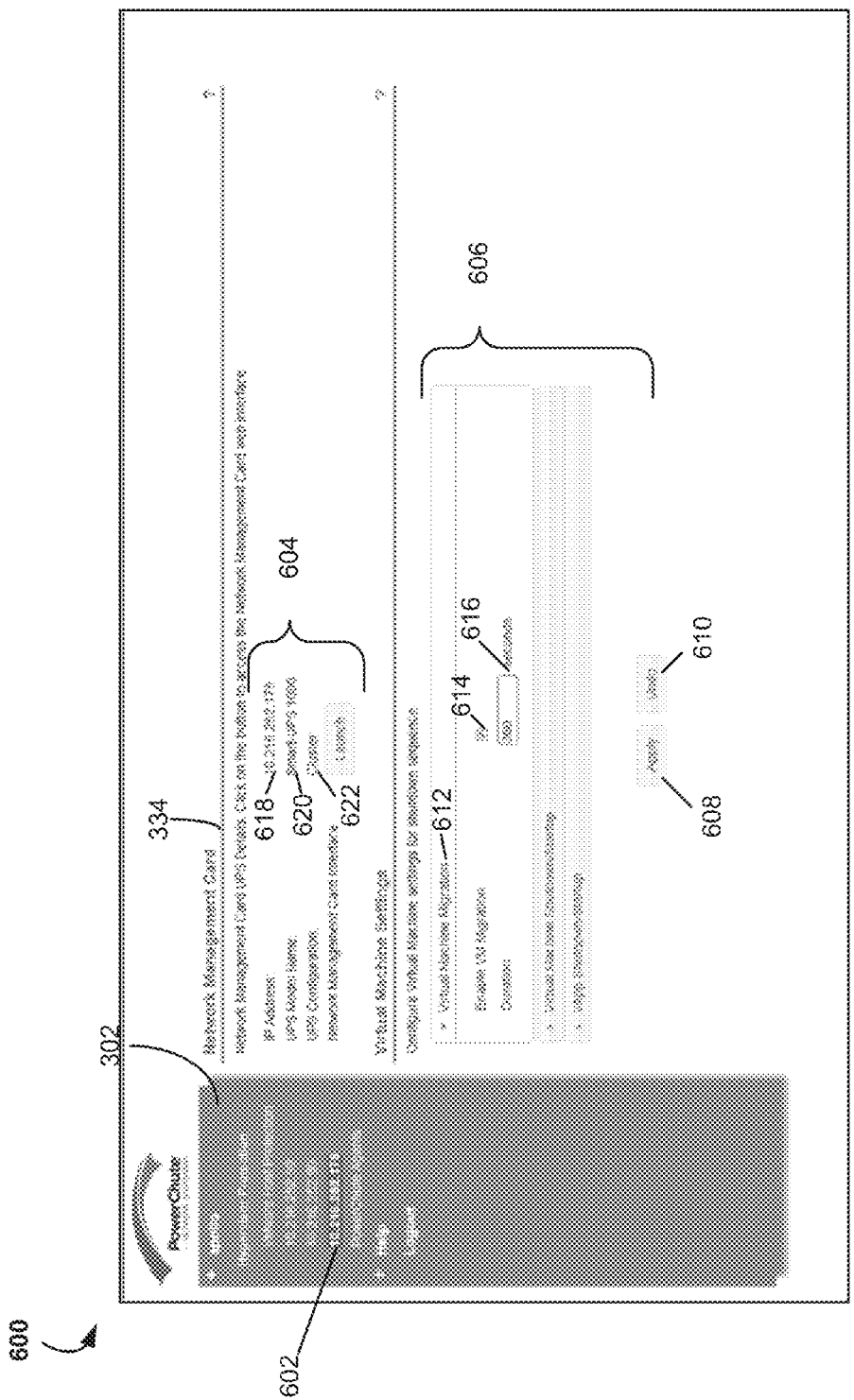
FIG. 6 is another illustration of a user interface of the virtual asset power management system.

As discussed above with reference to FIG. 3, the VAPMS 208 may allow settings to be applied at a fine-grain level. For example, UPS assets 310 (FIG. 3) are represented in the Power Supply Device list 310 located in the navigation panel 302. FIG. 6 with additional reference to FIG. 3, is another example of a user interface of the VAPMS 208 is generally indicated at 600. In this example, settings related to a UPS asset 602 may be visualized in the content panel 334. In the embodiment shown, the content panel 334 includes UPS details 604, a settings expander control 606, an apply button 608 and an undo button 610. The settings expander control 606 includes a plurality of settings categories including Migration settings 612. The Migration settings 612 include an Enable VM Migration check box 614 and a Duration entry box 616.

In one embodiment, the VAPMS 208 may enable settings specific to each individual power-related asset. The UPS details 604 may include information such as an IP address 618, a UPS model identifier 620 and a UPS configuration mode 622. The Enable VM Migration check box 614 overrides a global migration setting, such as the global migration option enabled by the Enable VM Migration checkbox 408 of FIG. 4. Likewise, the Duration entry box 616 overrides a duration setting defined by the Duration entry box 410 of FIG. 4.

Figure 7:
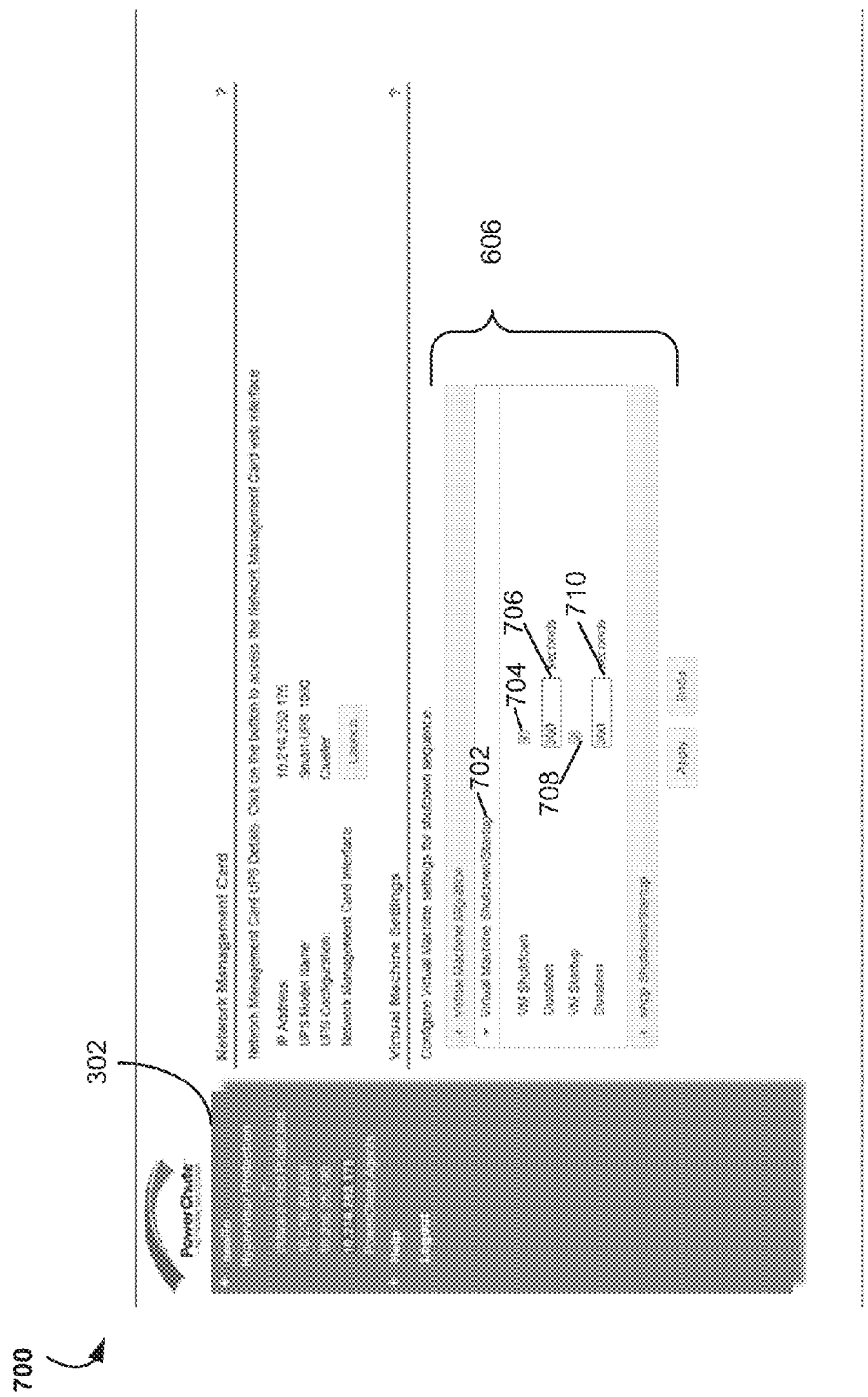
FIG. 7 is another illustration of a user interface of the virtual asset power management system.

Referring now to FIG. 7, with additional reference to FIG. 6, is another example of a user interface of the VAPMS 208 generally indicated at 700. As discussed above with reference to FIG. 6, asset-specific settings may override default configuration parameters within the VAPMS 208. In the embodiment shown, the extender control 606 includes a Virtual Machine Shutdown/Startup settings category 702. The Virtual Machine Shutdown/Startup settings category 702 includes a VM Shutdown checkbox 704, a VM Shutdown Duration entry box 706, a VM Startup checkbox 708, and a VM Startup Duration entry box 710. Similar to the Virtual Machine Migration settings category 612 of FIG. 6, global settings of the VAPMS 208 may be overridden in regards to shut down settings. For example, virtual machine shutdown/startup may be disabled for a particular Hypervisor by un-checking the VM Shutdown checkbox 704 and the VM Startup checkbox 710.

Figure 8:
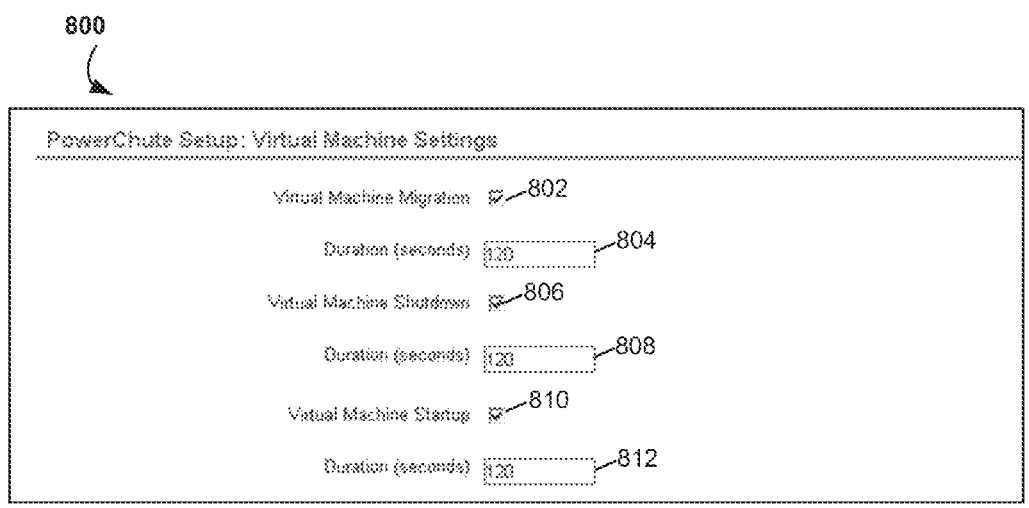
FIG. 8 is another illustration of a user interface of the virtual asset power management system.

Referring now FIG. 8 with additional reference to FIG. 2, is an example of a user interface 800 of the VAPMS 208 configured to adjust settings for all assets being protected. The user interface 800 includes a Virtual Machine Migration checkbox 802, a Virtual Machine Migration Duration entry box 804, a Virtual Machine Shutdown checkbox 806, a Virtual Machine Shutdown duration entry box 808, a Virtual Machine Startup checkbox 810, and a Virtual Machine Startup entry box 812.

In one embodiment, changes made to VAPMS 208 using the user interface 800 may override the default settings and asset-specific settings discussed above with reference to FIGS. 4-7.

Computer System

As discussed above with regard to FIG. 2, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 9:
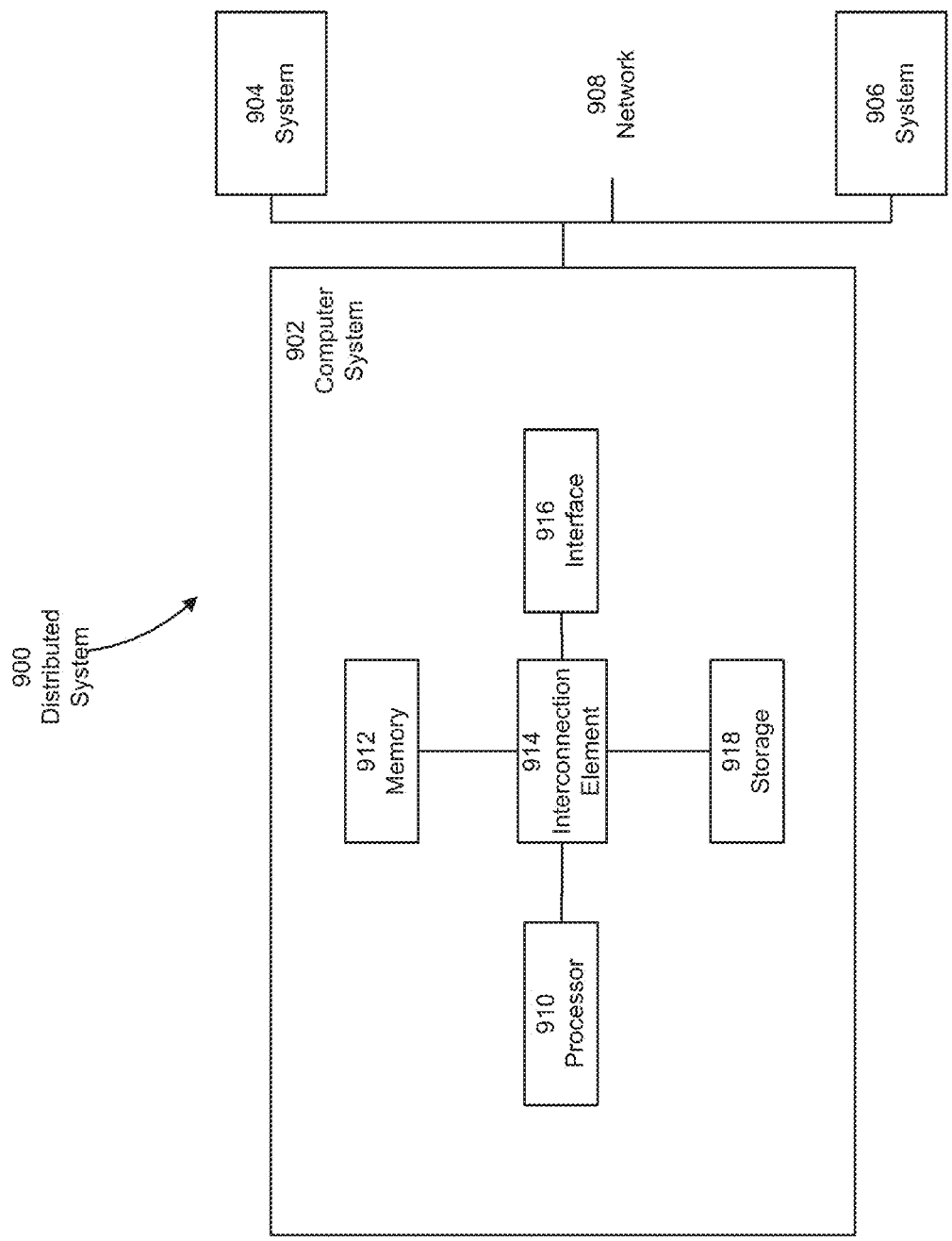
FIG. 9 is a block diagram of one example of a distributed computer system that may be used to perform processes and functions disclosed herein.

Referring to FIG. 9, there is illustrated a block diagram of a distributed computer system 900, in which various aspects and functions are practiced. As shown, the distributed computer system 900 includes one or more computer systems that exchange information. More specifically, the distributed computer system 900 includes computer systems 902, 904 and 906. As shown, the computer systems 902, 904 and 906 are interconnected by, and may exchange data through, a communication network 908. The network 908 may include any communication network through which computer systems may exchange data. To exchange data using the network 908, the computer systems 902, 904 and 906 and the network 908 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 902, 904 and 906 may transmit data via the network 908 using a variety of security measures including, for example, TLS, SSL or VPN. While the distributed computer system 900 illustrates three networked computer systems, the distributed computer system 900 is not so limited and may include any number of computer systems and computing devices, networked using any medium and communication protocol.

As illustrated in FIG. 9, the computer system 902 includes a processor 910, a memory 912, an interconnection element 914, an interface 916 and data storage element 918. To implement at least some of the aspects, functions and processes disclosed herein, the processor 910 performs a series of instructions that result in manipulated data. The processor 910 may be any type of processor, multiprocessor or controller. Some example processors include commercially available processors such as an Intel Xeon, Itanium, Core, Celeron, or Pentium processor, an AMD Opteron processor, an Apple A4 or A5 processor, a Sun UltraSPARC or IBM Power5+ processor and an IBM mainframe chip. The processor 910 is connected to other system components, including one or more memory devices 912, by the interconnection element 914.

The memory 912 stores programs and data during operation of the computer system 902. Thus, the memory 912 may be a relatively high performance, volatile, random access memory such as a dynamic random access memory ("DRAM") or static memory ("SRAM"). However, the memory 912 may include any device for storing data, such as a disk drive or other nonvolatile storage device. Various examples may organize the memory 912 into particularized and, in some cases, unique structures to perform the functions disclosed herein. These data structures may be sized and organized to store values for particular data and types of data.

Components of the computer system 902 are coupled by an interconnection element such as the interconnection element 914. The interconnection element 914 may include one or more physical busses, for example, busses between components that are integrated within a same machine, but may include any communication coupling between system elements including specialized or standard computing bus technologies such as IDE, SCSI, PCI and InfiniBand. The interconnection element 914 enables communications, such as data and instructions, to be exchanged between system components of the computer system 902.

The computer system 902 also includes one or more interface devices 916 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 902 to exchange information and to communicate with external entities, such as users and other systems.

The data storage element 918 includes a computer readable and writeable nonvolatile, or non-transitory, data storage medium in which instructions are stored that define a program or other object that is executed by the processor 910. The data storage element 918 also may include information that is recorded, on or in, the medium, and that is processed by the processor 910 during execution of the program. More specifically, the information may be stored in one or more data structures specifically configured to conserve storage space or increase data exchange performance. The instructions may be persistently stored as encoded signals, and the instructions may cause the processor 910 to perform any of the functions described herein. The medium may, for example, be optical disk, magnetic disk or flash memory, among others. In operation, the processor 910 or some other controller causes data to be read from the nonvolatile recording medium into another memory, such as the memory 912, that allows for faster access to the information by the processor 910 than does the storage medium included in the data storage element 918. The memory may be located in the data storage element 918 or in the memory 912, however, the processor 910 manipulates the data within the memory, and then copies the data to the storage medium associated with the data storage element 918 after processing is completed. A variety of components may manage data movement between the storage medium and other memory elements and examples are not limited to particular data management components. Further, examples are not limited to a particular memory system or data storage system.

Although the computer system 902 is shown by way of example as one type of computer system upon which various aspects and functions may be practiced, aspects and functions are not limited to being implemented on the computer system 902 as shown in FIG. 9. Various aspects and functions may be practiced on one or more computers having a different architectures or components than that shown in FIG. 9. For instance, the computer system 902 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 902 may be a computer system including an operating system that manages at least a portion of the hardware elements included in the computer system 902. In some examples, a processor or controller, such as the processor 910, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system or an iOS operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 910 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects, which are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Virtual Asset Power Management Processes

As described above with reference to FIG. 1, several embodiments perform processes that perform migration and shutdown of virtual machines based on power-related events. In some embodiments, these virtual asset power management processes are executed by a VAPMS, such as the VAPMS 208 described above with reference to FIG. 2. One example of such a virtual asset power management process 950 is illustrated in FIG. 10. According to this example, the process 950 includes acts of identifying IT assets, determining associations, and monitoring power-related events. The method begins in act 952.

In act 954, a VAPMS, such as the VAPMS 208 of FIG. 2, identifies one or more IT assets. In one embodiment, the VAPMS 208 may initially identify if one or UPSs are present within an IT environment. In this embodiment, the VAPMS 208 may initiate a discovery procedure via a network, such as the network 202 of FIG. 2. For example, a UDP message may be broadcasted to a subnet of the network 202. In another example, simple network management protocol (SNMP) may be used to identify the presence of one or more UPSs.

In another embodiment, the VAPMS 208 may identify other assets of the IT environment including Hypervisors. For example, some Hypervisors may be configured to respond to discovery requests. In some circumstances it may be necessary to enter Hypervisor information manually. For instance, the VAPMS 208 may provide a user interface or API which enables the manual creation of Hypervisor identifiers within the VAPMS 208.

In still another embodiment, the VAPMS 208 may communicate with a third-party virtualization management system, such as the third-party virtualization management system 214 of FIG. 2 to identify one or more Hypervisors and virtualized assets such as virtual machines. The VAPMS 208 may communicate via a web-service hosted on the third-party virtualization management system 214 and may initiate one or more API calls to retrieve a list of Hypervisors and their associated virtual machines. As discussed further below with reference to FIG. 11, third-party virtualization management systems may be integrated with to advantageously control the operation of Hypervisors and their virtual machines.

In yet another embodiment, the VAPMS 208 may communicate with one or more Hypervisors directly to identify what virtual machines are currently hosted. In addition, it should be understood that although integration with a third-party virtualization management system may be advantageous in certain circumstances, the VAPMS may perform migration and shutdown of virtual machines directly.

In one embodiment, identifiers of IT assets (clusters, UPSs, Hypervisors, virtual machines, etc) determined in the act 954 may be stored in a non-volatile memory area of the VAPMS 208.

In act 956, the VAPMS 208 may generate one or more associations between IT assets determined in the act 954. As discussed above with reference to FIG. 3, Hypervisors may be associated with one or more UPSs. In one embodiment, the associations may be manually defined by a user, such as the user 212, via the user interface 300. In other embodiments, the associations may be automatically determined when IT assets are initially determined in the act 954. For example, an IP address scheme may be used to determine a UPS device which is coupled to one or more Hypervisors. In this example an IP address assigned to the UPS device may have a particular octet set to a predefined constant. For instance, an IP address of 192.168.1.100 may be assigned to a UPS. The VAPMS 208 may then associate any IT asset with an IP address of 192.168.1.101-254 as being associated with the UPS.

In act 958, the VAPMS 208 may monitor power-related events from the one or UPSs identified in the act 954. As discussed below with reference to FIG. 10, power-related events may be received and correlated based on the associations generated in the act 956.

Processes in accord with the virtual asset power management process 950 enable the identification and association of IT assets with one or more UPSs. According to these processes, an end user may easily determine which IT assets are protected and what power-related asset they are protected by.

As described above with reference to the act 958, some embodiments perform processes through which the VAPMS 208 monitors power-related events from one or more UPSs. One example of such a monitoring of power-related events process is illustrated in FIG. 11. According to this example, the process 970 includes acts of receiving power-related events, determining sequence of actions, and performing the sequence of actions. The process begins in act 972.

In act 974, the VAPMS 208 receives an event via a network, such as the network 202 of FIG. 2, from a UPS or other IT asset within the IT environment 200. The event may be a power-related event and may indicate at least one of a power failure, current load, and a power restored event. The VAPMS 208 may determine which UPS the event originated from (e.g., by IP address, Hostname, contents of the event, etc). Once the originating asset of the event is determined, the VAPMS 208 may determine the originating asset's relationship with other IT assets based on the associations generated in the act 956 of FIG. 10. For example, the originating asset may be identified as the UPS 324 (FIG. 3) which may be associated with one or more Hypervisors.

In act 976, a sequence of actions may be determined based on the type of event, the identified originating asset of the power-related event, and IT assets potentially affected. For instance, if the type of event indicates a power failure then one or more associated IT assets may be affected. In one embodiment, the VAPMS 208 may determine a sequence of actions to perform including migrating virtual machines of affected IT assets to avoid service interruptions and maintain data integrity. Returning to the above-example, if the UPS 324 (FIG. 3) is associated with the Hypervisor 216 and the UPS 324 initiates a power event indicating loss of main power, the VAPMS 208 may determine one or more virtual machines hosted by the Hypervisor 216 which may be migrated to avoid interruption of service. As discussed above with reference to FIG. 3, some virtual machines may be hosting critical virtualized assets such as the VAPMS 208 and the third-party virtualization management system 214. The VAPMS 208 may determine that such critical virtualized assets should be migrated last.

In one embodiment, the sequence in which virtual machines are migrated is based on the associations generated in the act 956 of FIG. 10. In this embodiment, the order in which the IT asset nodes appear within the user interface 300 will govern the order in which migration occurs. For example, if the Hypervisor nodes 316 and 318 are associated with the UPS node 324, the order in which they appear below the UPS node 324 establishes the order of migration and/or shutdown. In some instances this order may be overridden based on whether an IT asset is a critical asset.

For example, a Hypervisor hosting an instance of the VAPMS 208 would be migrated and/or shutdown last regardless of the Hypervisor's position below a UPS node.

In various embodiments, an IT asset may be protected by more than one UPS. For example, a primary and secondary UPS may protect a group of related IT assets (e.g., in a cluster). In these embodiments, the VAPMS 208 may receive a power event indicating a power fault for one or more of the connected UPSs. The VAPMS 208 may then determine if at least one of the connected UPSs is operating normally. In one embodiment, if at least one UPS is operating normally no migrations may be initiated.

As discussed above with reference to FIGS. 4-7, the VAPMS 208 may be configured with global settings and asset-specific settings. The sequence of actions in response to a power event may be adapted based on these settings. The global settings may include a global option to allow virtual machines migration. This setting may be adjusted in the VAPMS 208 using the Enable VM Migration checkbox 408 (FIG. 4). In addition, the global settings may include a global option to allow the startup and shutdown of Hypervisors and their virtual machines. FIG. 5 includes an example of these settings that may be changed in the VAPMS 208 using the VM Shutdown checkbox 504 and the VM Startup checkbox 508. In one embodiment, these global settings may be overridden to provide a high degree of granularity and control by having distinct settings for each cluster, each IT asset within the clusters, and for each virtualized asset. One example of this fine-grain control is found above with reference to FIGS. 6-7.

In one embodiment, a UPS may include two or more outlet groups. In this embodiment, the sequence in which migration may occur may be based on the outlet groups. For example, Hypervisors associated with the Main Outlets group 328 of FIG. 3 may be migrated only after the Hypervisors associated with a secondary outlet group (e.g., the outlet group 330) are migrated first.

As discussed further below, in some embodiments it may be necessary to shutdown Hypervisors (and their virtual machines) in the event that there is no suitable Hypervisor in which the virtual machines may be migrated to. For example, an available Hypervisor may have insufficient processing and/or power resources to host additional virtual machines. In this example the VAPMS 208 may query a Hypervisor for current CPU usage, current number or running virtual machines, and available memory. In other examples, suitability may be based on whether a Hypervisor is coupled to a non-faulting UPS. In still other examples, migration of virtual machines may be limited to only Hypervisors within the same cluster. In these embodiments, the VAPMS 208 may not have a suitable Hypervisor in the cluster to migrate virtual machines to.

In another embodiment, a power event may indicate that power has been restored. In this embodiment a sequence similar to a sequence used to migrate virtual machines may be determined. However, during startup the order in which Hypervisors and other IT assets are started up is in reverse. For example, a Hypervisor hosting an instance of the third-party virtualization management system 214 may be migrated and/or shutdown last. During startup, however, the Hypervisor hosting an instance of the third-party virtualization management system 214 may be started up prior to other assets which depend on the third-party virtualization management system 214.

In act 978, the VAPMS 208 executes a sequence of actions determined in the act 976. In one embodiment, the sequence of actions may be based on receiving an event, such as an event indicating a power fault or restoration of power. As discussed below with reference to FIG. 12, the sequence of actions may include a list of affected IT assets and an order by which migration and/or shutdown may occur. The process ends in act 980.

Processes in accord with the virtual machine management process 970 enable the ability to correlate power-related events with an originating IT asset via associations within the VAPMS 208. IT assets which may be affected by the power-related event may be identified along with a sequence of actions. The sequence of actions may be executed to migrate and/or shutdown data center assets and virtual machines to avoid interruption of service and maintain data integrity.

As discussed above with reference to the act 978, the VAPMS 208 executes a sequence of actions determined in the act 976. One example of the process of executing a sequence of actions is illustrated in FIG. 12. According to this example, the process 990 includes acts of querying each Hypervisor, iterating through a list of virtual machines, communicating shutdown requests, and communicating startup requests. The process 990 begins the act 992.

In one embodiment the sequence of actions may be performed by the VAPMS 208. The sequence of actions may include a list of IT assets which may be affected by the power event and the action to be performed. For example, a list of Hypervisors may be included with the action being to migrate any virtual machines hosted therein. In act 994, the VAPMS 208 may query each Hypervisor directly for a list of currently running virtual machines. As discussed above with regards to FIG. 2, the VAPMS 208 may integrate with a third-party virtualization management system, such as the third-party virtualization management system 214, and may be configured to request a list of currently running virtual machines from the third-party virtualization management system 214.

In act 996, the VAPMS 208 may iterate through the list of currently running virtual machines and define the order in which the virtual machines should be shut down. For example, a virtual machine running an instance of the VAPMS 208, or other critical asset (e.g., third-party virtualization management system, storage array, etc) will be shutdown and migrated to a different Hypervisor last.

In act 998, the VAPMS 208 may initiate shutdown requests via a network, such as the network 202 in FIG. 2, in the defined order. In one embodiment, the VAPMS 208 communicates with a Hypervisor directly to gracefully shutdown the virtual machines in the defined order. In another embodiment, the VAPMS 208 communicates with a third-party virtualization management system, such as the third-party virtualization management system 214, to shutdown the virtual machines in the defined order.

The VAPMS 208 may continue to shutdown virtual machines until each Hypervisor affected by the power event received in the step 974 has been shutdown. In one embodiment, the VAPMS 208 may then communicate a shutdown command to each affected Hypervisor. In another embodiment, the VAPMS 208 may communicate a shutdown command through a third-party virtualization management system to shutdown each affected Hypervisor.

In act 1000, the VAPMS 208 may communicate startup requests to migrate each virtual machine shutdown in the act 996 to another Hypervisor. As discussed above with reference to FIG. 11, a suitable Hypervisor must be determined prior to migrating the virtual machines. In one embodiment, the communicated request may include a location of the virtual image stored on a storage array, such as the storage array 206 of FIG. 2.

In one embodiment, the shutdown requests of the act 998 and the startup requests of act 1000 may be performed sequentially. In this embodiment, the VAPMS may include a timer which determines the shutdown/startup request has exceeded a predefined period of time. As discussed above with reference to the FIG. 11, the predefined amount of time may be determined based on settings defined within the VAPMS 208. These settings may be adjusted via the user interfaces of FIGS. 4-8. When the predetermined amount of time has elapsed the VAPMS 208 may continue to the next virtual machine, Hypervisor, etc. In one embodiment, the VAPMS 208 may attempt a number of retries until the predetermined amount of time has elapsed.

Processes 950, 970, and 990, each depict one particular sequence of acts in a particular embodiment. The acts included in these processes may be performed by, or using, one or more computer systems specially configured as discussed herein. Some acts are optional and, as such, may be omitted in accord with one or more embodiments. Additionally, the order of the acts can be altered, or other acts can be added, without departing from the scope of the embodiments described herein. Furthermore, as described above, in at least one embodiment, the acts are performed on particular, specially configured machines, namely a VAPMS configured according to the examples and embodiments disclosed herein.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A power management system configured to protect a plurality of information technology (IT) assets, the system comprising:
    a memory;
    at least one processor coupled to the memory; and
    a migration component executable by the at least one processor and configured to:
        identify the plurality of IT assets, the plurality of IT assets including at least one power supply unit and at least one host server;
        generate an association between at least one IT asset and at least one power supply unit;
        receive a power-related event from the at least one power supply unit;
        correlate the power-related event with at least one affected IT asset based on the generated association;
        determine if at least one of the virtual machines is a critical IT asset;
        determine a sequence of actions, wherein the sequence of actions is configured to migrate at least one virtual machine from the at least one affected IT asset to a non-affected IT asset and wherein the sequence of actions includes actions identifying the plurality of virtual machines in an ordered list; and
        execute the sequence of actions.

2. The system of claim 1, wherein the at least one power supply unit is a uninterruptable power supply (UPS), and wherein the UPS includes a primary outlet group and a second outlet group, and wherein the at least one host server is coupled to at least one of the primary outlet group and the second outlet group.

3. The system of claim 1, wherein the plurality of IT assets are identified via a discovery procedure.

4. The system of claim 1, wherein the generated association is generated between the at least one IT asset and the at least one power supply unit based on input received from visual elements of a user interface, the user interface visualizing a mapping of the at least one power supply unit and the at least one IT asset associated with the at least one power supply unit.

5. The system of claim 4, wherein the generated association is modified by a user dragging-and-dropping a representation of an unassociated IT asset of the plurality of IT assets onto the mapping.

6. The system of claim 4, wherein the ordered list is ordered based on an order in which IT assets appear in the mapping.

7. The system of claim 1, wherein the at least one affected IT asset is identified as affected by the power-related event based on the generated association between the at least one power supply unit and one or more mapped IT assets associated with the at least one power supply unit.

8. The system of claim 1, wherein the migration component is further configured to communicate directly with the at least one affected IT asset to determine a plurality of virtual machines hosted by the at least one affected IT asset.

9. The system of claim 1, wherein the migration component is further configured to communicate indirectly with the at least one affected IT asset to determine a plurality of virtual machines hosted by the at least one affected IT asset.

10. The system of claim 1, wherein the executed sequence of actions includes an action to migrate at least one critical IT asset last.

11. A method of managing a plurality of information technology (IT) assets using a computer system including a memory, a display, and at least one processor coupled to the memory and the display, the method comprising:
    identifying the plurality of IT assets, the plurality of IT assets including at least one power supply unit and at least one host server;
    generating an association between at least one IT asset and at least one power supply unit;
    receiving information related to a power-related event from the at least one power supply unit;
    correlating the power-related event with at least one affected IT asset based on the generated association;
    identifying at least one IT asset of the plurality of IT assets as being a critical IT asset;
    determining a sequence of actions, wherein the sequence of actions is configured to migrate at least one virtual machine from at least one affected IT asset and wherein the sequence of actions includes actions identifying the plurality of virtual machines in an ordered list; and
    executing the sequence of actions.

12. The method of claim 11, wherein the act of generating the association between at least one IT asset and at least one power supply unit includes generating a user interface, the user interface visually representing a mapping of at least one power supply unit and the at least one IT asset associated with the at least one power supply unit.

13. The method of claim 11, wherein the act of executing the sequence of actions includes communicating directly with each IT asset based on the ordered list.

14. The method of claim 11, the method further comprising transmitting a shutdown command for each virtual machine of the plurality of virtual machines based on the ordered list, wherein transmitting the shutdown command further includes shutting down the critical IT asset last.

15. The method of claim 11, the method further comprising determining one or more IT assets for migration of the plurality of virtual machines.

16. The method of claim 15, wherein the act of determining one or more IT assets for migration of the plurality of virtual machines includes determining whether the one or more IT assets are coupled to a power supply unit not experiencing a power failure based on the generated association.

17. A non-transitory computer readable medium storing instructions for managing a plurality of IT assets, the instructions being executable by at least one processor of a computer system, the instructions configured to instruct the computer system to:
   identify the plurality of IT assets, the plurality of IT assets including at least one power supply unit and at least one host server;
   generate an association between at least one IT asset and at least one power supply unit;
   receive a power-related event from the at least one power supply unit;
   correlate the power-related event with at least one affected IT asset based on the generated association;
   identify at least one IT asset of the plurality of IT assets as being a critical IT asset;
   determine a sequence of actions, wherein the sequence of actions is configured to migrate at least one virtual machine from the at least one IT asset to a non-affected IT asset and wherein the sequence of actions includes actions identifying the plurality of virtual machines in an ordered list; and
   execute the sequence of actions.

18. The non-transitory computer readable medium of claim 17, wherein the generated association is an association between the at least one IT asset and the at least one power supply unit based on input received from visual elements of a user interface, the user interface generating a mapping of the at least one power supply unit and the at least one IT asset associated to the at least one power supply unit.

* * * * *